United States Patent [19]

Laughner

[11] Patent Number: 5,273,706
[45] Date of Patent: * Dec. 28, 1993

[54] BLOW MOLDING OF THERMOPLASTIC POLYMERIC COMPOSITIONS CONTAINING A FLUORINATED OLEFIN

[75] Inventor: Michael K. Laughner, Lake Jackson, Tex.

[73] Assignee: The Dow Chemical Company, Midland, Mich.

[*] Notice: The portion of the term of this patent subsequent to Mar. 10, 2009 has been disclaimed.

[21] Appl. No.: 848,634

[22] Filed: Mar. 9, 1992

Related U.S. Application Data

[63] Continuation-in-part of Ser. No. 432,831, Nov. 6, 1989, Pat. No. 5,094,806.

[51] Int. Cl.$^5$ .................................................. B29C 49/04
[52] U.S. Cl. .................................... 264/540; 525/165
[58] Field of Search .............. 264/211, 328.17, 331.13, 264/331.14, 523, 540, 537; 425/532; 525/69, 90, 123, 146, 165, 178, 199, 206, 211, 218, 227, 231, 240, 238

[56] References Cited

U.S. PATENT DOCUMENTS

| | | | |
|---|---|---|---|
| 3,005,795 | 10/1961 | Busse et al. | 260/45.5 |
| 3,294,871 | 12/1966 | Schmitt et al. | 260/900 |
| 3,673,278 | 6/1972 | Bialous | 260/873 |
| 3,723,373 | 3/1973 | Lucas | 260/29.6 F |
| 4,001,184 | 1/1977 | Scott | 260/47 X |
| 4,020,122 | 4/1977 | Borman et al. | 260/835 |
| 4,161,579 | 7/1979 | Edelman et al. | 525/444 |
| 4,415,722 | 11/1983 | Mark et al. | 528/196 |
| 4,419,485 | 12/1983 | Borman et al. | 525/437 |
| 4,474,999 | 10/1984 | Mark et al. | 568/720 |
| 4,767,821 | 8/1988 | Lindner et al. | 525/72 |
| 4,786,686 | 11/1988 | Laughner et al. | 525/67 |
| 4,804,703 | 2/1990 | Subramanian | 525/166 |
| 4,826,900 | 5/1989 | Ogoe et al. | 524/126 |
| 4,900,788 | 2/1989 | Subramanian | 525/183 |
| 4,902,788 | 2/1990 | Kassal et al. | 525/151 |
| 4,914,156 | 4/1990 | Howe | 525/166 |
| 4,966,941 | 10/1990 | Subramanian | 525/66 |

OTHER PUBLICATIONS

Derwent Abstract 88-122064/18.
Derwent 89-345,370.
Derwent 84-109,292/18.

*Primary Examiner*—Catherine Timm

[57] ABSTRACT

A process of blow molding, and compositions useful in the process. Articles weighing more than five pounds are blow molded from preforms weighing more than ten pounds formed from compositions containing thermoplastic polymeric material, a fluorinated olefinic polymer or copolymer and, optionally, an elastomeric impact modifier.

71 Claims, No Drawings

BLOW MOLDING OF THERMOPLASTIC POLYMERIC COMPOSITIONS CONTAINING A FLUORINATED OLEFIN

CROSS REFERENCE TO RELATED APPLICATION

This application is a continuation-in-part of application Ser. No. 07/432,831, filed Nov. 6, 1989, now U.S. Pat. No. 5,094,806.

FIELD OF THE INVENTION

This invention relates to an improved process for blow molding thermoplastic compositions, more particularly relates to a process for modifying thermoplastic polymeric materials or resins to make them more useful for blow molding purposes, and relates also to such modified compositions and articles blow molded therefrom.

BACKGROUND OF THE INVENTION

Although many thermoplastic resins have been found to be injection moldable over a broad range of conditions, only certain thermoplastic resins are suitable for blow molding. This is due to the unique demand placed on a thermoplastic material by the blow molding operation. In one aspect of the conventional blow molding operation, a cylindrically shaped parison, or preform, of a heat softened thermoplastic material is extruded vertically downward until the parison has attained a preselected length. A split cavity mold is then closed around the parison, pinching its walls together at least at one end, and optionally at intermediate locations and at the other end as well. Compressed gas is injected into the parison, either from one of the ends or through one or more blow pins inserted in its side, to inflate the parison against the sides of the mold in a fashion similar to the expansion of a balloon. Contact of the thermoplastic material with the mold causes it to cool and harden in the shape of the mold.

Because a parison is formed as a single, integral piece of thermoplastic material, and the inflating medium acts from its interior to shape it with outward pressure, blow molding makes possible the fabrication of "hollow" articles, wherein two or more walls define or contain a completely enclosed space, or a series of such spaces. These articles range from as simple a shape as a shampoo bottle to a complex article such as an extensively contoured automotive instrument panel containing multiple interior channels which function as ducts for wiring or for a heating/ventilating/air conditioning system. However, the successful use of a particular thermoplastic resin in a blow molding operation, as described above, is dependent to a great extent on certain physical characteristics of the heat softened polymeric resin or material. A low level of melt strength in the material from which the parison is extruded can limit the length and diameter of the parison, and thus the size and wall thickness of the object being molded.

The use of fibril-forming polytetrafluoroethylene ("PTFE") to increase the melt viscosity and elasticity of high molecular weight organic polymers for use in melt extrusion and thermoforming is set forth in Busse, U.S. Pat. No. 3,005,795. However, no mention is made therein of the blow molding process, or of the use of non-fibril-forming PTFE or other fluorine-containing olefin polymers or copolymers for the purpose of improving the melt properties of an organic polymer. Nor is any suggestion present therein as to the use of a fluorine-containing olefin polymer or copolymer in conjunction with a blend of two or more organic polymers.

It would accordingly be desirable to have methods, and to have compositions useful in such methods, for employing a variety of fluorinated olefinic polymers or copolymers to increase the melt strength of a variety of thermoplastic polymeric materials or resins to be used in a blow molding operation, thereby improving the quality of articles blow molded from said compositions.

SUMMARY OF THE INVENTION

In one aspect, this invention is (1) a method of blow molding an article, comprising (a) providing a composition which comprises (i) thermoplastic polymeric material, and (ii) a fluorinated olefinic polymer or copolymer which is about 0.001% to about 5% of said composition by weight; and (b) blow molding said composition; as well as (2) a method of increasing the melt strength of a blow molding composition, comprising forming said composition by admixing thermoplastic polymeric material with a fluorinated olefinic polymer or copolymer. In another aspect, this invention is a composition of matter comprising, in admixture, (a) thermoplastic polymeric material, and (b) a fluorinated olefinic polymer or copolymer which is about 0.001% to about 5% of said composition by weight; said composition being characterized by having sufficient melt strength that an article of acceptable quality is blow moldable therefrom. In a further aspect, this invention is a parison for use in blow molding comprising, in admixture, thermoplastic polymeric material and a fluorinated olefinic polymer or copolymer, said parison being characterized by the ability to support its own weight when suspended from a die bushing.

The methods and compositions of this invention are useful, for example, in the production of molded or shaped articles of virtually all varieties, especially bottles and other containers, and components for use in the transportation and appliance industries.

DETAILED DESCRIPTION OF THE INVENTION

In the methods of this invention, a fluorinated olefinic polymer or copolymer and, optionally, an elastomeric impact modifier, is admixed with thermoplastic polymeric material (or more than one such material) for the purpose of increasing the melt strength of the polymeric material in a blow molding operation, thereby improving the blowability of the polymeric material and the surface quality and the tack seam strength of the article molded.

The compositions of this invention are those in which a small but effective amount of a fluorinated olefinic polymer or copolymer is admixed with thermoplastic polymeric material for the purpose of increasing the melt strength of the thermoplastic polymeric material. An elastomeric impact modifier can optionally be incorporated into the compositions of this invention as well. Suitable ranges of content for the compositions of this invention, by weight percent of the total composition, are as follows: thermoplastic polymeric material about 75% to about 99.999%, fluorinated olefinic polymer or copolymer about 0.001% to about 5%, and elastomeric impact modifier optionally up to about 20%. Preferred ranges of content for the compositions of this invention, by weight percent of the total composition, are as follows: thermoplastic polymeric material about 81% to about 99.99%, fluorinated olefinic polymer or copolymer about 0.01% to about 3%, and elastomeric impact modifier optionally up to about 16%.

A fluorinated olefinic polymer or copolymer is used in this invention in an amount of about 0.001% to about 5% by weight of the thermoplastic composition which is being blow molded. Enough fluorinated olefinic polymer or copolymer, i.e. about 0.001% or more, must be used to achieve the desired increase in melt strength. However, it is found that use of a fluorinated olefinic polymer or copolymer in an amount greater than about 5% by weight in a thermoplastic composition to be blow molded (a) yields a molded article which has a tendency to suffer from surface pitting, a condition similar to that resulting in a blow molded article when a fluorinated olefinic polymer or copolymer is poorly dispersed in a thermoplastic polymeric composition, and (b) significantly increases the likelihood that the molded article will experience brittle rather than ductile failure when impacted at subambient temperature.

Preparation of the compositions of this invention can be accomplished by any suitable means known in the art which result in a thorough, homogeneous distribution and dispersion in the thermoplastic polymeric material or resin of the substances to be admixed therewith. For example, the materials can be dry blended and agitated in particulate form, and the dry blended formulation can later be melt mixed in an extruder as a separate step. Alternatively, a fluorinated olefinic polymer or copolymer, or an aqueous dispersion thereof, can be mixed in a solution which also contains thermoplastic polymeric material and, optionally, impact modifiers. The composition can then be recovered from such solution by devolatilization or by coprecipitation of the desired solutes. Appropriate solvents for such purpose include, but are not limited to, methylene chloride, acetone, benzaldehyde, aniline, heptane or ethylene glycol.

Thermoplastic Polymeric Material. Virtually any thermoplastic polymeric material or resin which can be melted, heat softened or dissolved in a solvent is appropriate for use in the methods and compositions of this invention. Thermoplastic resins such as polymers, copolymers and alloys and blends of two or more thereof, including but not limited to non-carbonate polymers or copolymers, but excluding fluorinated olefinic polymers and copolymers, are ideally suited for use as the thermoplastic polymeric material of this invention. Non-carbonate polymers or copolymers are those which do not contain an —[—O—R—O—C(O)—]— repeating unit, where R is an organic (e.g. $C_1$-$C_{20}$) radical.

The following are exemplary of polymers suitable for use as thermoplastic polymeric material herein, but this listing is not intended to be exhaustive or to limit the scope of this invention:

polyacetal, including that which is formed by the bond opening and polymerization of the carbonyl group of an aldehyde to give a —(—CH$_2$—O—)— repeating unit, as well as the reaction products of polyols and aldehydes;
polyacrylamide;
polyacrylate;
polyacrylonitrile;
polyalkenamer (polyalkenylene), including metathesis polymers obtained by the ring opening polymerization of a cycloolefin as catalyzed by a transition metal to give a =(=C—R—C=)= repeating unit;
polyamide;
polyaminotriazole, including that which is prepared by the polycondensation of dihydrazides of dicarboxylic acids or of the diesters of dicarboxylic acids with hydrazine;
polyarylate
poly(arylene sulfide), including that which is prepared by the reaction of p-dichlorobenzene with Na$_2$S in a polar organic solvent to give a —(—pAr—S—)— repeating unit;
azo polymers, including those which are prepared by the polymerization of an azobutyronitrile with a diamine or diol to give a —(—R—N=N—R—)— repeating unit or those prepared by polymerization of monomers containing an azo side group in addition to a polymerizable functionality to give a —[—R(N=N—R')—]— repeating unit;
polybenzimidazole, including that which is prepared by condensation of aromatic tetraamino compounds with dicarboxylic acids;
polycarbonate, including copolymers thereof;
polyester (including copolymers thereof), which may be a polycarbonate or a non-carbonate polyester;
polyetheretherketone, including that which is prepared by the polycondensation under anhydrous conditions of a bisphenol, such as hydroquinone, and an aromatic dihalide in which the halogen atoms are activated by carbonyl groups, such as 4,4'-difluorobenzophenone, to give a —[—Ar—O—Ar—C(O)—Ar—O—]— repeating unit;
poly(ethylene oxide);
polyhydrazide, including that which is prepared by low temperature solution polycondensation under anhydrous conditions of a dicarboxylic acid chloride with dihydrazide in an amide solvent to give a —[—R—C(O)—NH—NH—C(O)—R'—]— repeating unit;
polyimidazole, including that which is prepared by polymerization of vinylimidazole monomer;
polyimide, including that which is prepared by condensation of bifunctional carboxylic acid anhydrides with a diamine to give a —[—C(O)—N—R—C(O)—]— repeating unit;
polyisocyanide, including that which is prepared by the cationically initiated α,α-addition of monoisocyanides;
polyketone, including that which has a —[—(R)C(R')—O—]— repeating unit;
poly(methyl methacrylate)
polyolefin, including copolymers thereof;
poly(phenylene ether), including that which is prepared by the oxidative coupling polymerization of a phenol to give a —(—pAr—O—)— repeating unit;
polyphosphazine, including that which is prepared by the polymerization of the cyclic trimer produced by the reaction of phosphorous pentachloride and ammonium chloride to give a —[—N=P(R$_2$)—]— repeating unit,
poly(propylene oxide);
polyquinoxaline, including that which is prepared by the solution polymerization of aromatic bis(odiamine) and bis(glyoxal hydrate);
polysilane;
polysiloxane;
polystyrene, including copolymers thereof;
polysulfone;
polyurea;
polyurethane; and vinyl polymers, including poly(vinyl acetate), poly(vinyl alcohol), poly(vinyl amide), poly(vinyl chloride), and poly(vinyl ether), including copolymers of each; where R and R' are organic (e.g. $C_1-C_{20}$) radicals and Ar is an aromatic organic (e.g. $C_6-C_{10}$) radical.

This invention is also applicable to thermoplastic copolymers formed from two or more monomers or co-monomers, such copolymers including but not being limited to acrylonitrile/butadiene/styrene copolymer,
acrylonitrile/EPDM/styrene copolymer where EPDM is ethylene/propylene/diene rubber,
acrylonitrile/styrene/alkyl acrylate copolymer,
co-polyester/carbonate,
ethylene/carbon monoxide copolymer,
ethylene vinyl acetate copolymer,
methyl methacrylate/butadiene/styrene/acrylonitrile copolymer,
phenyl maleimide/acrylonitrile/butadiene/styrene copolymer,
polycarbonate formed from more than one dihydroxy compound,
polyester formed from more than one diol and/or more than one diacid,
styrene/acrylonitrile copolymer, and
styrene/maleic anhydride copolymer;
as well as to blends and alloys of two or more thermoplastic polymers and/or copolymers. Examples of such blends are
acrylonitrile/butadiene/styrene copolymer blended with polycarbonate, polyamide, polyester, or polyurethane;
polyacetal blended with polyurethane;
polycarbonate blended with polyamide, polyester, or styrene/acrylonitrile copolymer; and
polyphenylene ether blended with (i) polyamide and a vinyl aromatic/conjugated diene di- or tri-block copolymer; (ii) polyester; or (iii) polystyrene to which can be grafted a vinyl aromatic/conjugated diene di- or tri-block copolymer.

Other copolymers of particular interest for use in the compositions of this invention are those prepared from one or more of the group of monomers consisting of acrylic or methacrylic acid; a $C_1-C_{12}$ alkyl acrylate or methacrylate; glycidyl methacrylate; acrylamide or methacrylamide; a vinyl aromatic compound such as styrene or a $C_1-C_{12}$ alkyl or alkoxy or halogen substituted styrene; a vinyl nitrite compound such as acrylonitrile or methacrylonitrile; a $C_4-C_{12}$ diene; a $C_2-C_{12}$ olefin or halogen substituted olefin, particularly olefins containing no reactive sites; maleic, fumaric itaconic acid or anhydride; a $C_1-C_{12}$ dialkyl maleate, fumarate or itaconate; a $C_1-C_{10}$ alkyl or a $C_6-C_{12}$ aryl maleimide; vinyl acetate; vinyl benzoate; vinyl carbazole; vinyl cyanide; vinyl pyridine; a $C_8-C_{16}$ alkyl vinyl ether; allyl acetate; allyl alcohol; allyl chloride; a $C_1-C_{12}$ alkyl vinyl ketone or sulfone; and an oxazoline compound. Alkyl or aryl maleimide compounds include the reaction product of an alkyl or aryl primary amine and maleic anhydride. An oxazoline compound includes those of the general formula

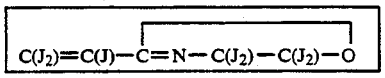

where each J is independently hydrogen, halogen, a $C_1-C_{10}$ alkyl radical or a $C_6-C_{14}$ aryl radical.

In a preferred embodiment, the polymers and copolymers used in the compositions of this invention, particularly olefinic polymers and copolymers, do not include any reactive species which would cause cross-linking or chemical bonding of any of said polymers or copolymers with each other. Representative examples of such species are ionic, acid, anhydride, epoxy or epoxide groups.

Mixtures of thermoplastic polymers and/or copolymers and/or blends of two or more thermoplastic polymers and/or copolymers are also suitable for use in this invention.

Thermoplastic polymers, copolymers, and blends of two or more thermoplastic polymers and/or copolymers, can be used in this invention with or without rubber modification. Rubber modification of a polymer, copolymer or blend typically takes the form of a rubbery domain grafted to a thermoplastic matrix. This results in thermoplastic polymeric material containing less than about 40% rubber by weight, and is to be distinguished from optional addition of an elastomeric impact modifier as a separate component to the compositions of this invention, which results in a composition containing more than about 40% rubber by weight.

Fluorinated Polyolefin. The fluorinated olefinic polymers or copolymers useful in this invention are those wherein fluorine atoms or fluorinated organic (e.g. $C_1-C_{12}$) side chains have been substituted for the hydrogen atoms on an ethylenic polymeric backbone, and include as examples:
PTFE;
fluorinated ethylene/propylene copolymers ("FEP"), such as tetrafluoroethylene/hexafluoropropylene copolymer;
perfluoroalkoxy fluorocarbons ("PFA"), such as tetrafluoroethyl/perfluoro propyl vinyl ether copolymer; and
ethylene/tetrafluoroethylene copolymers ("ETFE"). Of these fluorinated olefinic polymers or copolymers, PTFE, either fibril-forming or non-fibril-forming, is preferred, and fibril-forming PTFE is most preferred.

PTFE can be made by the granular polymerization process wherein tetrafluoroethylene ("TFE") is pressured into an agitated aqueous solution of free radical initiator at pressures of 5–80 kg and at temperatures of 50°–150° C. Initiators can be redox systems, azo initiators, peroxides or inorganic persulfates. The polymer particles coagulate as they are formed. Fine-powder PTFE can be made by a process similar to the foregoing except that sufficient dispersing agent is used to maintain a stable dispersion throughout polymerization and avoid premature coagulation. The dispersing agent is anionic and substantially non-telogenic, such as a fluorinated carboxylate containing 7-20 carbons. TFE is prepared by reacting hydrogen fluoride and chloroform to give chlorodifluoromethane, which is then pyrolyzed in a noncatalytic gas-phase reaction at atmospheric or reduced pressure, usually at about 590°-900° C., to obtain tetrafluoroethylene. The processes for making PTFE described above are discussed in greater detail in U.S. Pat. Nos. 2,393,967, 3,855,191 and 4,186,121, each of which is incorporated herein.

Although it is preferred to employ fibril-forming PTFE in this invention, non-fibril-forming PTFE is also useful herein. Fibril-forming PTFE is typically considered to be that which has a structure wherein PTFE particles having an average size of 0.1–0.2 microns are held together by fibrils having diameters from a fourth to a tenth or less of the diameters of the particles. PTFE which loses or does not form such structure, as a result of mechanical shearing, is typically considered to be non-fibril-forming. For example, PTFE which has been sintered by heating above 330° C., or has been given $10^6$ or more of 2 mev. electron radiation, loses or has greatly reduced capacity to form fibrils upon mechanical shearing.

Hexafluoropropylene ("HFP") can be produced by thermally cracking TFE at reduced pressure at 700+–800° C. or by fluorinating 3-chloropentafluoro-1-propene at 200° C. over activated carbon catalyst. These methods of producing HFP are discussed in greater detail, respectively, in U.S. Pat. No. 3,758,138 and U.S. Pat. No. 3,047,640. each being incorporated herein. HFP and TFE form a random copolymer and can be copolymerized to form FEP by irradiation, or by using trichloroacetyl peroxide as the catalyst at low temperature, or by aqueous or non-aqueous dispersion. These methods of making FEP are discussed in greater detail, respectively, in U.S. Pat. No. 2,598,283 and U.S. Pat. No. 3,132,124, each being incorporated herein.

PFA are copolymers which contain a fluorocarbon backbone in the main chain and randomly distributed perfluorinated ether side chains, and can be generally represented by a repeating unit such as $-[-CF_2-CF_2-C(O-CF_2-R)F-CF_2-]-$, where R is a fluorinated organic (e.g. $C_1-C_{11}$) radical. A PFA is prepared by polymerizing a perfluorovinyl ether. A perfluorovinyl ether can be prepared by oxidizing HFP to the epoxide, reacting the epoxide with a perfluorinated acyl fluoride to obtain an alkoxyacyl fluoride, which is then converted to a perfluorovinyl ether by treatment with base at about 300° C., a method which is discussed in greater detail in U.S. Pat. No. 3,291,843, which is incorporated herein.

Ethylene and TFE can be polymerized to form ETFE by suspension or emulsion methods, usually below 100° C. and at about 5 MPa. The reaction conditions should favor the homopolymerization of PTFE but not ethylene. Initiators can include peroxides, redox systems, free-radical sources, and ionizing radiation. Such methods for forming ETFE are discussed in greater detail in U.S. Pat. No. 3,401,155, which is incorporated herein.

The fluorinated olefinic polymer or copolymer of this invention increases the melt strength of thermoplastic polymeric material with which it is admixed. The desirability for such increase can be described with reference, for example, to extrusion blow molding. In extrusion blow molding, molten polymeric material or resin passes from an extruder into an accumulator head, from which it is discharged to flow about a torpedo-shaped mandrel which is surrounded by a die. The die and mandrel make up an annulus through which the resin melt stream forms the parison as it flows out from, and becomes suspended from, the die bushing. The shearing forces of the extruder screw, and the forced flow from the accumulator head through the die, mechanically induce molecular elongation and orientation in the resin. However, as the parison is extruded and descends from the die bushing, those shearing forces are relieved, and the resin is free to undergo elastic recovery. The fluorinated olefinic polymer or copolymer assists in this process because it appears to possess a high degree of elastic memory and is believed to experience strain relaxation much as a stretched coil spring would upon release from the stretching tension. However, the elastic recovery of the fluorinated olefinic polymer or copolymer which results when it is freed from the shearing, mechanical stress of the extruder and accumulator head is to be distinguished from similar behavior which PTFE may display when contained in an extruded sheet which is heated for use in thermoforming. In an extruded sheet, PTFE has by cooling been locked into a stretched, elongated position and orientation within the molded extrudate from which the sheet is formed. When the sheet is softened in preparation for thermoforming, the PTFE molecules are allowed to move into a more stable configuration because of the application of heat rather than because of the removal of shearing forces.

The recoil action of a fluorinated olefinic polymer or copolymer at low shear increases the melt strength of thermoplastic polymeric material with which it is admixed, which is of particular importance when that polymeric material or resin is being used to blow mold large articles, which frequently weigh more than five pounds. The blow molding of such large articles requires parisons which often weigh more than ten pounds, and exceed twelve inches in diameter and sixty inches in length. Melt strength in this context refers to the ability of the molten polymeric material to support its own weight, when suspended from the die bushing, under the tensile stress imposed by gravitational pull.

High melt strength is needed in the thermoplastic polymeric material from which a large parison is formed to prevent the parison from experiencing drawdown, which is a continual thinning of the parison wall occurring simultaneously as the parison is being extruded. The initial effect of drawdown is that the resin forming the parison, after being forced from the die bushing by a piston in the accumulator head, continues thereafter to flow downward under the force of gravity and distort the shape of the parison. When such vertical displacement of polymeric material or resin continues during and after expulsion from the accumulator head, the parison tends to assume an hourglass shape, and too great a quantity of resin accumulates in its lower portion. If the polymeric material forming the parison wall in the area immediately adjacent to the die bushing becomes thin enough that the melt strength of the resin is insufficient to support the weight of the parison, the entire parison can tear away from the die bushing. This is clearly the most undesirable result of drawdown because the parison is then completely useless for any molding activity. Although the tearing away of a parison from a die bushing is a qualitative indication that the parison is unable to support its own weight because the resin from which it is formed has insufficient melt strength to allow it so do so, an example of a quantitative melt strength test useful in the blow molding context is the ratio of the times of extrusion of the first and second halves of a polymer strand, as described in U.S. Pat. No. 4,161,579, which is incorporated herein.

The extreme requirement which the need for parison support places on the melt strength of blow molding material can be illustrated by contrasting that requirement with the conditions applicable to a sheet of polymeric material to be thermoformed. Consider, for example, a 60"×24"×⅛" sheet weighing 400 grams which is supported for thermoforming purposes ½" on all four sides. Almost all of the gravitational pull, which causes the sheet to droop as it is softened, impacts the unsupported portion of the sheet, which weighs approximately 377 grams. The weight of the unsupported portion of the sheet subject to deformation during the heating process is therefore spread over the ⅛" rails to the extent of an average of approximately 4.54 g/in². If the same sheet were to be extruded as a parison, the entire weight of the parison, 400 grams, 4.54 is not only unsupported by rails or any other mechanical means, but is supported solely by the melt strength of the molding material which is present in the ⅛" thickness of the portion of the parison immediately adjacent to the die bushing. That portion of the parison, using the dimensions of the sheet set forth above, has an area of 2.95 in², meaning that the weight of the whole parison is supported by the melt strength of the molding material alone to the extent of an average of approximately 135.6 g/in², approximately thirty times more than the value calculated for thermoforming. Further, the melt strength of a blow molding material must resist not only the gravitational pull on the weight of the parison, but the momentum which the parison experiences because of its downward motion as it is extruded from the die. High melt strength is therefore a critical aspect of any resin to be blow molded, and the need for high melt strength in a blow molding resin can often be many times greater than the need for it in a thermoforming material.

When not accompanied by high melt strength, high viscosity alone in the molten extrudate is believed to typically not be sufficient to give the degree of tenacity needed to allow a parison to resist the effects of drawdown and support its own weight during extrusion and during the interval between completion of extrusion and the closing of the mold around it. In fact, if a blow molding resin is too viscous, a parison formed therefrom may 3Well upon extrusion to the extent that its walls are undesirably thickened, the pressure of the inflating medium may not be sufficient to properly inflate such a parison within a mold, and sufficient pressure may not exist in the accumulator head to extrude the resin and form a parison in the first place.

The adverse effects of drawdown make it very difficult, if not impossible, to blow mold an article of acceptable quality from a parison which has experienced drawdown. Acceptable quality in this context denotes a blow molded article which does not suffer from the defects in appearance and physical properties which can be caused by the adverse effects of parison drawdown. Among the adverse effects of parison drawdown, the primary example is improper vertical distribution of the polymeric material used for molding. If the molding material simply thins out, the walls of the parison, and thus the molded article, will almost certainly be too thin in the upper and/or middle portions and too thick in the lower portion. Where walls are too thin, they are subject to rupture by forces ordinarily encountered in the service environment in which the article is to be used. If curtaining occurs, where waves or rivulets of the molding material dribble down the parison wall, detailed features of the article, such as a bottle handle, lip and threads at bottle mouth for screw or snap-on closure, ribbing, or undercuts to form body panels for bottle labeling, will likely be ruined. The methods of this invention reduce the adverse effects of parison drawdown to the extent necessary, and the compositions of this invention are characterized by forming a parison sufficiently free of drawdown, to obtain therefrom a blow molded article of acceptable quality.

As the thermoplastic polymeric compositions of this invention contain a fluorinated olefinic polymer or copolymer and are thus characterized by increased melt strength, they can be compounded in an extruder and formed into a parison at a higher temperature, without experiencing drawdown, than a molding material which does not contain a fluorinated olefinic polymer or copolymer and therefore does not have increased melt strength. The ability to blow mold the compositions of this invention at virtually as high a temperature as is possible without experiencing parison drawdown is one of the desirable features of this invention, and is a distinct advantage in forming a strong, durable tack seam. A tack seam is formed at any point where the structure of the mold causes the walls of the parison to be pinched together. At least one tack seam is formed at an end of the cylindrical parison opposite from the end at which an inflating medium is injected, but tack seams can also be formed at both ends and at numerous intermediate points according to the design of the article being molded and the location of the blow pins. The hotter the material forming the parison, the more readily the walls of the parison adhere and tack to one another when pinched together, thereby enhancing formation of a strong tack seam. Good tack seam strength is realized in the methods and compositions of this invention when a composition, containing thermoplastic polymeric material and a fluorinated olefinic polymer or copolymer, is blow molded at a temperature which is higher than the temperature at which a parison, formed from said thermoplastic polymeric material not admixed with a fluorinated olefinic polymer or copolymer, experiences the adverse effects of drawdown. An article which is constructed with multiple walls formed from strong tack seams is surprisingly rigid and has a high strength to weight ratio as compared to a solid article of identical size and shape formed, for example, by injection molding or conventional thermoforming.

Additional advantages are obtained when the blow molding compositions of this invention are extruded at higher temperature to form a parison because higher temperature will cause the parison to be less viscous, and the inflating medium will consequently press the walls of the parison tighter against the mold. The surface of a molded article will more faithfully reproduce the condition of the mold because of this more intimate contact between the heat softened resin of which the parison is formed and the mold surface. If the mold is smooth, the surface of an article will be smoother and have a higher gloss when molded from a hot resin, and when the mold is textured, an article will show that texture with greater definition when molded from a parison brought to a high temperature. Good surface quality cannot be as easily obtained when blow molding materials which do not have the higher melt strength of the compositions of this invention because such materials will experience drawdown before they can be brought to a high enough temperature to obtain the desired improvement in surface quality. The use of a fluorinated olefinic polymer or copolymer to increase the melt strength of a thermoplastic polymeric material therefore enables extruding a parison at a higher temperature and furnishes a method of blow molding an article having a tack seam of increased strength with a surface which more faithfully reproduces the condition of the mold.

It is preferred but not necessary that the thermoplastic polymeric compositions of this invention be melt processed, in preparation for blow molding, at a temperature below the melting point of the fluorinated olefinic polymer or copolymer contained therein. However, some of the polymeric materials useful herein, known as "high heat" materials, cannot be softened to the extent necessary to be compounded with a fluorinated olefinic polymer or copolymer at a temperature below the melting point of such fluorinated olefinic polymer or copolymer. When it is desired to prepare a composition of this invention, containing at least one of such high heat polymeric materials, at a temperature below such melting point, it is found to be particularly advantageous to do so by incorporating such high heat material into a blend of two or more thermoplastic polymers and/or copolymers. The melt processing temperature of a polymeric blend used in this invention, at which the components thereof flow and are workable sufficiently to enable homogeneous dispersion therein of a fluorinated olefinic polymer or copolymer (and other components, if any), is lower than the highest processing temperature of any of its respective components. High heat polymeric materials, which could not by themselves be melt processed at a temperature below the melting point of a fluorinated olefinic polymer or copolymer, can consequently be compounded in preparation for blow molding below such melting point by being incorporated into a polymeric blend which does have a processing temperature below such melting point. When a thermoplastic polymeric blend is used as described above to lower the melt processing temperature of a composition below the melting point of a fluorinated olefinic polymer or copolymer, a greater variety of polymeric materials can be compounded with a fluorinated olefinic polymer or copolymer to form said composition than is true in the absence of a blend because of the opportunity which exists to melt process high heat materials as a part of such blend at a temperature below such melting point.

Elastomeric Impact Modifier. The elastomeric impact modifiers which can be optionally used in this invention are core-shell or thermoplastic rubbers having a glass transition temperature ($T_g$) less than 0° C. and typically containing greater than 40% by weight of rubber. When used, these elastomeric impact modifiers are added as separate components during preparation of the compositions of this invention as distinguished from the grafting of a rubbery phase onto the thermoplastic matrix of a thermoplastic polymer or copolymer used in a composition of this invention. Examples of elastomeric impact modifiers useful in this invention are an MBS rubber or a selectively hydrogenated vinyl aromatic/conjugated diene di- or tri-block copolymer. The elastomeric impact modifiers may be used in an impact modifying amount, which may, for example, be up to about 20 percent by weight of the total composition.

An MBS rubber contains a substrate latex, or core, which is made by polymerizing a conjugated diene, or by copolymerizing a conjugated diene with a mono-olefin or polar vinyl compound, such as styrene, acrylonitrile or methyl methacrylate. The substrate latex is typically made up of about 45–75% conjugated diene and about 25–55% of the monoolefin or polar vinyl compound. A mixture of monomers is graft polymerized to the substrate latex. A variety of monomers may be used for this grafting purpose, of which the following are exemplary: vinyl compounds such as vinyl toluene, alpha-methyl styrene, halogenated styrene, naphthalene, acrylonitrile, methacrylonitrile or alpha-halogenated acrylonitrile, or a $C_1$–$C_8$ alkyl acrylate such as methacrylate, ethylacrylate or hexyl acrylate, a $C_1$–$C_8$ alkyl methacrylate such as methyl methacrylate, ethyl methacrylate or hexyl methacrylate, an acrylic or methacrylic acid, or a mixture of two or more of the foregoing.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for an MBS rubber is about 60–80 parts by weight substrate latex, about 10–20 parts by weight first monomer and about 10–20 parts by weight second monomer. A preferred formulation of an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A product having substantially such content is available commercially from Rohm and Haas Company as Paraloid TM EXL 3607 core-shell polymer. The MBS rubber and methods for making same, as described above, are discussed in greater detail in Saito, U.S. Pat. No. 3,287,443 (Kanegafuchi), Curfman, U.S. Pat. No. 3,657,391 (Borg-Warner) and Fromuth, U.S. Pat. No. 4,180,494 (Rohm and Haas), each of which is hereby incorporated as a part hereof.

The hydrogenated block copolymer utilized in this invention can be either linear or branched, and can be either a di-block copolymer having a —[—$A_x$—$B_y$—]— repeating unit or a tri-block copolymer having a —[—$A_x$—$B_y$—$A_z$—]— repeating unit, where x, y and z are individually whole numbers exceeding 1. The "A" portions are made by polymerizing a mono-alkenyl aromatic hydrocarbon and has an average molecular weight of about 4,000 to about 115,000, and a weight preferably of about 8,000 to about 60,000. The "B" portion of the block copolymer results from polymerizing a conjugated diene and has a molecular weight of about 20,000 to about 450,000, and a weight preferably of about 50,000 to about 300,000. The "A" groups typically constitute about 2 wt % to about 55 wt % of the whole block copolymer, and preferably are between 5 wt % and 30 wt % of the whole block copolymer.

Monomers from which the "A" blocks of the block copolymer can be formed are, for example, styrene and substituted derivatives thereof such as α-methyl styrene, vinyl xylene, vinyl naphthalene, and the like, and mixtures of two or more thereof. The polymerization is initiated by lithium metal, or alkyl- or aryl lithium compounds such as butyl lithium or isoamyl lithium. Polymerization is normally conducted at temperatures ranging from about −20° C. to about 100° C., and initiator is used in as low an amount as possible up to about 200 ppm based on the weight of the monomers present. A hydrocarbon inert to the polymerization reaction, for example an alkane such as hexane, is used as solvent for the reaction. Polymerization is typically carried out under a nitrogen blanket. When the initiator is injected into the monomer, anionic polymerization ensues forming a "living" polymer which carries the charge originally acquired from the initiator.

The "B" group of the hydrogenated block copolymer can be formed simply by injecting suitable monomer into the reaction vessel and displacing the lithium radical from the just-polymerized "A" block, which acts as an initiator because it is still charged. The "B" block is formed predominantly from $C_4$-$C_{10}$ conjugated dienes, such as butadiene or isoprene. The "B" block will be characterized by elastomeric properties which allow it to absorb and dissipate an applied stress and then regain its shape.

To reduce oxidative and thermal instability, the block copolymers used herein are also desirably hydrogenated to reduce the degree of unsaturation on the polymer chain and on the pendant aromatic rings. Typical hydrogenation catalysts utilized are Raney nickel, molybdenum sulfide, finely divided palladium and platinum oxide. The hydrogenation reaction is typically run at 75°-450° F. and at 100-1000 psig for 10-25 hours. The amount of catalyst used is a function of the temperature of the reaction and the degree of hydrogenation desired.

The hydrogenated block copolymers used herein can also contain reactive groups, such as an anhydride group, which are capable of reacting with and bonding to the thermoplastic polymeric material of this invention.

The most preferred —[—A—B—A—]— block copolymers are those having a styrene-butadiene-styrene or a styrene-isoprene-styrene configuration. Kraton G-1651, available from Shell Chemical Company, is an —[—A—B—A—]— block copolymer which has been found particularly useful in this invention. The —[—A—B—]— and —[—A—B—A—]— block copolymers described above are discussed in greater detail in Haefele, U.S. Pat. No. 3,333,024 (Shell) and Wald, U.S. Pat. No. 595,942 (Shell), each of which is incorporated herein.

The elastomeric impact modifiers useful in this invention also include, but are not limited to, alkyl acrylate rubbers, ethylene/propylene and ethylene/propylene/diene rubbers, neoprene, nitrile rubbers, polyether rubbers, polyisoprene, and silicone rubbers.

The processes and compositions of this invention are applicable in operations which include, but are not limited to, extrusion blow molding and injection blow molding, including both stretch extrusion blow molding and stretch injection blow molding, profile blow molding, and rotational blow molding.

The compositions of this invention can further contain conventional thermoplastic polymer additives which include, but are not limited to, fillers, thermal stabilizers, dyes, flame retarding agents, reinforcing agents, softeners, mold-release agents, seed-forming agents, pigments, plasticizers, antistatic agents, UV absorbers, lubricants, compatibilizers, and the like, in conventional amounts generally not exceeding 25% by weight of the total composition.

Illustrative Embodiments. To illustrate the practice of this invention, examples of several preferred embodiments are set forth below. It is not intended, however, that these examples (Examples 1-17) should in any manner restrict the scope of this invention. Some of the particularly desirable features of this invention may be seen by contrasting the characteristics of Examples 1-17 with those of various controlled formulations (Controls A-K) which do not possess the features of, and are not therefore embodiments of, this invention.

Examples 1-17 and Controls A-K, shown below as the compositions set forth in Tables I-VII, are dry blended and agitated in a Lightning Blender for 30 seconds. The dry blended formulations are then melt mixed in a vented 30 mm Werner-Phfleiderer co-rotating, twin screw extruder at 250 rpm using a set temperature sufficient to fully soften and obtain good processability of the material, depending on the contents of a particular formulation. The set temperatures to obtain good processability in the formulations of Examples 1-17 and Controls A-K range from about 130° C. to about 280° C. Each extruded composition is passed through a water bath, chopped into granules and collected for molding. To counteract moisture absorption, all samples except the olefins are thoroughly dried in a circulated air oven at 115° F. for a minimum of 4 hours prior to molding. ASTM Type I tensile bars (see ASTM Designation D 638-87b) are prepared by injection molding on a 75 ton Arburg molding machine. Mold temperatures in the range of 100° F.-175° F., are used in molding the tensile bars from the various compositions. The content of Examples 1-17 and Controls A-K is set forth below by weight percent in Tables I-VII.

TABLE I

Composition (by weight) of Examples 1-2 and Controls A-B

| | Control A | Example 1 | Control B | Example 2 |
|---|---|---|---|---|
| PC 300-10 | 65.5 | 65.8 | 31.4 | 31.5 |
| Branched PC | 0 | 0 | 31.4 | 31.5 |
| ABS Y23 | 34.0 | 34.0 | 30.9 | 31.0 |
| Paraloid TM 3607 | 0 | 0 | 5.8 | 5.8 |
| Irganox TM 1076 | 0.2 | 0.2 | 0.2 | 0.2 |
| Teflon TM 6C | 0 | 0.3 | 0 | 0.3 | where
- PC 300-10 is Calibre TM linear polycarbonate from the Dow Chemical Company having a 10 melt flow rate ("MFR"), as measured in g/10 min. by ASTM Designation D 1238-86 (Condition 300/1.2).
- Branched PC is 3 MFR branched polycarbonate.
- ABS Y23 is ABS resin having, by weight, 23% acrylonitrile, 20% butadiene, and 57% styrene.
- Paraloid TM 3607 is MBS rubber from Rohm & Haas Company.
- Irganox TM 1076 is phenolic antioxidant from Ciba-Geigy Corp.
- Teflon TM 6C is fibril-forming PTFE from DuPont.

TABLE II

Composition (by weight) of Example 3 and Control C

| | Control C | Example 3 |
|---|---|---|
| Kodar TM PETG | 100 | 99.7 |
| Teflon TM 6C | 0 | 0.3 | where

Kodar ™ PETG is polyester copolymer from Eastman Kodak Co.

Teflon ™ 6C is fibril-forming PTFE from DuPont.

TABLE III

Composition (by weight) of Examples 4-7 and Control D

|  | Control D | Example 4 | Example 5 | Example 6 | Example 7 |
|---|---|---|---|---|---|
| X16 | 100 | 99.7 | 99 | 99 | 99 |
| Teflon ™ FEP | 0 | 0 | 0 | 1 | 0 |
| Teflon ™ PFA | 0 | 0 | 1 | 0 | 0 |
| Tefzel ™ | 0 | 0 | 0 | 0 | 1 |
| Teflon ™ 6C | 0 | 0.3 | 0 | 0 | 0 | where

X16 is resin having, by weight, 16% acrylonitrile, 7% rubber and 77% styrene,

Teflon ™ FEP is powdered fluorinated ethylene/propylene copolymer from DuPont.

Teflon ™ PFA is powdered perfluoralkoxy copolymer from DuPont.

Tefzel ™ is powdered ethylene/tetrafluorethylene copolymer from DuPont.

Teflon ™ 6C is fibril-forming PTFE from DuPont.

TABLE IV

Composition (by weight) of Examples 8-10 and Control E

|  | Control E | Example 8 | Example 9 | Example 10 |
|---|---|---|---|---|
| PC 300-10 | 100 | 99 | 99 | 99.7 |
| Teflon ™ PFA | 0 | 1 | 0 | 0 |
| Tefzel ™ | 0 | 0 | 1 | 0 |
| Teflon ™ 6C | 0 | 0 | 0 | 0.3 | where

PC 300-10 is 10 MFR Calibre ™ polycarbonate from The Dow Chemical Company.

Teflon ™ PFA is powdered perfluoralkoxy copolymer from DuPont.

Tefzel ™ is powdered ethylene/tetrafluorethylene copolymer from DuPont.

Teflon ™ 6C is fibril-forming PTFE from DuPont.

TABLE V

Composition (by weight) of Examples 11-13 and Control F

|  | Control F | Example 11 | Example 12 | Example 13 |
|---|---|---|---|---|
| PC 300-3 | 0 | 0 | 99.5 | 0 |
| PC 300-6 | 0 | 0 | 0 | 99.5 |
| PC 300-10 | 100 | 99.7 | 0 | 0 |
| Teflon ™ 9B | 0 | 0.3 | 0 | 0 |
| Teflon ™ 6C | 0 | 0 | 0.5 | 0.5 | where

PC 300-3 is 3 MFR Calibre ™ polycarbonate from The Dow Chemical Company.

PC 300-6 is 6 MFR Calibre ™ polycarbonate from The Dow Chemical Company.

PC 300-10 is 10 MFR Calibre ™ polycarbonate from The Dow Chemical Company.

Teflon ™ 9B is pre-sintered, non-fibril-forming PTFE from DuPont.

Teflon ™ 6C is fibril-forming PTFE from DuPont.

TABLE VI

Composition (by weight) of Examples 14-15 and Controls G-H

|  | Control G | Example 14 | Control H | Example 15 |
|---|---|---|---|---|
| Noryl ™ N300 | 100 | 99.7 | 0 | 0 |
| PC 300-10 | 0 | 0 | 73.8 | 73.5 |
| Tratuf ™ 9506 | 0 | 0 | 20.0 | 20.0 |
| Metablen ™ PA2130 | 0 | 0 | 6.2 | 6.2 |
| Teflon ™ 6C | 0 | 0.3 | 0 | 0.3 | where

Noryl ™ N300 is polyphenylene oxide/high impact polystyrene alloy from General Electric.

PC 300-10 is 10 Calibre ™ polycarbonate from The Dow Chemical Company.

Tratuf ™ 9506 is 0.95 intrinsic viscosity polyester from Goodyear Tire and Rubber Co.

Metablen ™ PA2130 is MBS rubber from M&T chemicals.

Teflon ™ 6C is fibril-forming PTFE from DuPont.

TABLE VII

Composition (by weight) of Examples 16-17 and Controls J-K

|  | Control J | Example 16 | Control K | Example 17 |
|---|---|---|---|---|
| ECO | 100 | 99.7 | 0 | 0 |
| PUR | 0 | 0 | 100 | 99.7 |
| Teflon ™ 6C | 0 | 0.3 | 0 | 0.3 | where

ECO is ethylene/carbon monoxide copolymer, 10% by weight of which is derived from carbon monoxide.

PUR is Isoplast ™ 201 rubber-modified, high hard segment polyurethane from The Dow Chemical Company.

Teflon ™ 6C is fibril-forming PTFE from DuPont.

Various amounts of weight are attached to the end of each of the predried tensile bars, prepared as above, and the bars are hung vertically in a forced air oven for 5 minutes at temperatures which are comparable to those at which the compositions from which the tensile bars prepared would be blow molded. The weight reported in Table VIII for each tensile bar is the amount of weight which had to be attached to the bar before it showed any detectable elongation by reason of being heated with weight attached.

TABLE VIII

Weight Supported by Tensile Bars

| Composition | Attached Weight (grams) | Oven Temperature (°C.) |
|---|---|---|
| Control A | 4 | 200 |
| Example 1 | 37 | 200 |
| Control B | 10 | 200 |
| Example 2 | 70 | 200 |
| Control C | 0 | 170 |
| Example 3 | 35 | 170 |
| Control D | 10 | 180 |
| Example 4 | 40 | 180 |
| Example 5 | 22 | 180 |
| Example 6 | 22 | 180 |
| Example 7 | 20 | 180 |

TABLE VIII-continued

Weight Supported by Tensile Bars

| Composition | Attached Weight (grams) | Oven Temperature (°C.) |
|---|---|---|
| Control E | 18 | 190 |
| Example 8 | 32 | 190 |
| Example 9 | 32 | 190 |
| Example 10 | 40 | 190 |
| Control F | 1 | 220 |
| Example 11 | 15 | 220 |
| Example 12 | 38 | 220 |
| Example 13 | 38 | 220 |

TABLE VIII

Weight Supported by Tensile Bars

| Composition | Attached Weight (grams) | Oven Temperature (°C.) |
|---|---|---|
| Control G | 30 | 230 |
| Example 14 | 60 | 230 |
| Control H | 20 | 260 |
| Example 15 | 50 | 260 |
| Control J | 0 | 130 |
| Example 16 | 20 | 130 |
| Control K | 8 | 200 |
| Example 17 | 16 | 200 |

The dramatic increase in the amount of weight which a tensile bar can support without elongation at temperatures representative of blow molding conditions, resulting from the presence of a fluorinated olefinic polymer of copolymer in the composition from which the bar is fabricated, is readily evident from the above data. For instance, when a fluorinated olefinic polymer or copolymer is added to Control A, a tensile bar formed from the resulting composition (Example 1) supports more than 9 times the weight, and Example 2 supports more than 7 times as much weight as Control B. Controls C and J support no weight, but the addition of a fluorinated olefinic polymer or copolymer to the compositions from which they are formed (Examples 3 and 16, respectively) enables a tensile bar to support a significant amount of weight without elongation. Similarly improved results are seen for each of other thermoplastic polymeric materials tested. Examples 5–9 show that the addition of fluorinated olefinic polymers and copolymers other than PTFE to thermoplastic polymeric material is effective to increase the amount of weight supportable without elongation by a tensile bar, and Example 11 shows that presintered, non-fibril-forming PTFE is also effective for this purpose. The increase in the amount of weight supportable without elongation by the tensile bars in the above examples indicates that the melt strength of the thermoplastic polymeric material from which the bars are made is increased by the presence of a fluorinated olefinic polymer or copolymer therein. Correspondingly, the melt strength of blow moldable thermoplastic polymeric material is increased in similar fashion by the presence of a fluorinated olefinic polymer or copolymer therein.

As a further demonstration of increased melt strength, the composition of Example 2 is blow molded using a 50 pound Kautex accumulator head which has an 18 inch tooling diameter and a tooling angle of 30°. The head employs a 3.5 inch extruder, with a length to diameter ratio of 24:1, utilizing a barrier screw running at 18 rpm and having set temperatures at 350° F. to 365° F. for each zone. Melt temperatures are measured at approximately 425° F., and mold temperatures are set at 150° F. A parison 85 inches in length is extruded weighing 40 pounds and having a layflat of 26 inches at both the top and bottom.

Pinch bars to support the parison are not required because of its high melt strength; and, because of reduced drawdown, preblow of the parison is not required. An excellent quality blow molded part with uniform wall thickness, excellent tack strength and good surface quality is obtained.

Testing on this blow molded part shows the following physical properties:

| | |
|---|---|
| 264 psi deflection temperature under load (ASTM D 648-82) | 215° F. |
| Flexural modulus (ASTM D 790-84a) | 317,000 psi |
| Tensile strength (ASTM D 638-84) | 7,000 psi |
| Elongation (ASTM D 638-84) | 78% |
| 10 mil notched Izod impact (ASTM D 256-84) | |
| 73° F. | 11.5 ft-lbs |
| −20° F. | 8.6 ft-lbs |

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A method of blow molding a contoured automotive part which weighs more than five pounds, comprising (a) providing a composition which consists essentially of a mixture of
   (i) one or more of the members of the group consisting of polyamide; polyester; poly(methyl methacrylate); polyolefin homopolymer; poly(phenylene ether); polystyrene; polyurethane; acrylonitrile/butadiene/styrene copolymer; acrylonitrile/EPDM/styrene copolymer where EPDM is ethylene/propylene/diene rubber; acrylonitrile/styrene/alkyl acrylate copolymer; ethylene/carbon monoxide copolymer; styrene/acrylonitrile copolymer; and a blend of (A) poly(phenylene ether), (B) polystyrene, and (C) a vinyl aromatic/conjugated diene di- or tri-block copolymer;
   (ii) a fluorinated olefinic polymer or copolymer which is present in a melt strength increasing amount of about 0.001 percent to about 5 percent of said composition by weight; and
   (iii) one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers;

(b) extrusion melt processing said composition into a hollow preform which weighs more than ten pounds, wherein the melt strength of said hollow preform is increased by the presence of said fluorinated olefinic polymer or copolymer; and (c) blow molding said automotive component which weighs more than five pounds from said hollow preform.

2. The method of claim 1 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

3. The method of claim 1 wherein said polyester is a polycarbonate, a non-carbonate polyester or a mixture thereof.

4. The method of claim 1 wherein said blend of (a) poly(phenylene ether), (b) polystyrene and (c) a vinyl aromatic/conjugated diene di- or tri-block copolymer is (I) such a blend wherein said vinyl aromatic/conjugated diene di- or tri-block copolymer is grafted to said polystyrene, (II) such a blend wherein said vinyl aromatic/conjugated diene di- or tri-block copolymer is not grafted to said polystyrene, or a mixture of blends (I) and (II).

5. The method of claim 1 wherein said hollow preform exceeds twelve inches in diameter and sixty inches in length.

6. The method of claim 1 wherein said automotive component is an instrument panel.

7. The method of claim 1 wherein component (a)(i) of said composition is one of more of the members of the group consisting of polyester; poly(phenylene ether); polystyrene acrylonitrile/butadiene/styrene copolymer; ethylene/propylene/diene rubber; acrylonitrile/styrene/alkyl acrylate copolymer; styrene/acrylonitrile copolymer; and a blend of (A) poly(phenylene ether), (B) polystyrene, and (C) a vinyl aromatic/conjugated diene di- or tri-block copolymer.

8. The method of claim 7 wherein said polyester is a polycarbonate, a non-carbonate polyester or a mixture thereof.

9. The method of claim 8 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

10. The method of claim 9 wherein said blend of (a) poly(phenylene ether), (b) polystyrene and (c) a vinyl aromatic/conjugated diene di- or tri-block copolymer is (I) such a blend wherein said vinyl aromatic/conjugated diene di- or tri-block copolymer is grafted to said polystyrene, (II) such a blend wherein said vinyl aromatic/conjugated diene di- or tri-block copolymer is not grafted to said polystyrene, or a mixture of blends (I) and (II).

11. The method of claim 10 wherein said automotive component is an instrument panel.

12. The method of claim 1 wherein component (a)(i) of said composition is one of more of the members of the group consisting of polyester; acrylonitrile/butadiene/styrene copolymer; acrylonitrile/EPDM/styrene copolymer where EPDM is ethylene/propylene/diene rubber; acrylonitrile/styrene/alkyl acrylate copolymer; and styrene/acrylonitrile copolymer.

13. The method of claim 12 wherein said polyester is a polycarbonate, a non-carbonate polyester or a mixture thereof.

14. The method of claim 13 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

15. The method of claim 14 wherein said automotive component is an instrument panel.

16. A method of blow molding a contoured automotive part which weighs more than five pounds, comprising (a) providing a composition which consists essentially of a mixture of
  (i) one or more of the members of the group consisting of polyacetal; polyacrylamide; polyacrylate, polyacrylonitrile, polyalkenamer (polyalkenylene); polyaminotriazole; polyarylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); vinyl acetate copolymer; vinyl alcohol copolymer; vinyl amide copolymer; vinyl chloride copolymer; vinyl ether copolymer; co-polyester/carbonate; ethylene vinyl acetate copolymer; methyl methacrylate/butadiene/styrene/acrylonitrile copolymer; phenyl maleimide/acrylonitrile/butadiene/styrene copolymer; polycarbonate formed from more than one dihydroxy compound; polyester formed from more than one diol and/or more than one diacid; a blend of polyphenylene ether, polyamide and a vinyl aromatic/conjugated di- or tri-block copolymer; and styrene/maleic anhydride copolymer; and
  (ii) a fluorinated olefinic polymer or copolymer which is present in a melt strength increasing amount of about 0.001 percent to about 5 percent of said composition by weight; and
(b) extrusion melt processing said composition into a hollow preform which weighs more than ten pounds, wherein the melt strength of said hollow preform is increased by the presence of said fluorinated olefinic polymer or copolymer; and
(c) blow molding said automotive component which weighs more than five pounds from said hollow preform.

17. The method of claim 16 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

18. The method of claim 16 wherein said composition further consists essentially of one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

19. The method of claim 16 wherein said hollow preform exceeds twelve inches in diameter and sixty inches in length.

20. The method of claim 16 wherein said hollow preform in an instrument panel.

21. A method of blow molding a contoured automotive part which weighs more than five pounds, comprising
(a) providing a composition which consists essentially of a mixture of
  (i) one or more of the members of the group consisting of polyamide; polyester; poly(methyl methacrylate); polyolefin homopolymer; poly(phenylene ether); polystyrene; polyurethane; acrylonitrile/butadiene/styrene copolymer; acrylonitrile/EPDM/styrene copolymer where EPDM is ethylene/propylene/diene rubber; acrylonitrile/styrene/alkyl acrylate copolymer; ethylene/carbon monoxide copolymer; styrene/acrylonitrile copolymer; and a blend of (A) poly(phenylene ether), (B) polystyrene, and (C) a vinyl aromatic/conjugated diene di- or tri-block copolymer;
  (ii) one or more of the members of the group consisting of polyacetal; polyacrylamide; polyacrylate, polyacrylonitrile, polyalkenamer (polyalkenylene); polyaminotriazole; polyarylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); vinyl acetate copolymer; vinyl alcohol copolymer; vinyl amide copolymer; vinyl chloride copolymer; vinyl ether copolymer; co-polyester/carbonate; ethylene vinyl acetate copolymer; methyl methacrylate/butadiene/styrene/acrylonitrile copolymer; phenyl maleimide/acrylonitrile/butadiene/styrene copolymer; polycarbonate formed from more than one dihydroxy compound; polyester formed from more than one diol and/or more than one diacid; a blend of polyphenylene ether, polyamide and a vinyl aromatic/conjugated di- or tri-block copolymer; and styrene/maleic anhydride copolymer; and
  (iii) a fluorinated olefinic polymer or copolymer which is present in a melt strength increasing amount of about 0.001 percent to about 5 percent of said composition by weight;
(b) extrusion melt processing said composition into a hollow preform which weighs more than ten pounds, wherein the melt strength of said hollow preform is increased by the presence of said fluorinated olefinic polymer or copolymer; and
(c) blow molding said automotive component which weighs more than five pounds from said hollow preform.

22. The method of claim 21 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

23. The method of claim 21 wherein the polyester of component (i) is a polycarbonate, a non-carbonate polyester or a mixture thereof.

24. The method of claim 21 wherein, in component (i), said blend of (a) poly(phenylene ether), (b) polystyrene and (c) a vinyl aromatic/conjugated diene di- or tri-block copolymer is (I) such a blend wherein said vinyl aromatic/conjugated diene di- or tri-block copolymer is grafted to said polystyrene, (II) such a blend wherein said vinyl aromatic/conjugated diene di- or tri-block copolymer is not grafted to said polystyrene, or a mixture of blends (I) and (II).

25. The method of claim 21 wherein said composition further consists essentially of one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatabilizers.

26. The method of claim 21 wherein said hollow preform exceeds twelve inches in diameter and sixty inches in length.

27. The method of claim 21 wherein said automotive component is an instrument panel.

28. A method of blow molding a contoured automotive part which weighs more than five pounds, comprising
(a) providing a composition which consists essentially of a mixture of
  (i) one or more copolymers prepared from one or more members of the group of monomers consisting of a $C_1$-$C_{12}$ alkyl acrylate or methacrylate; acrylamide or methacrylamide, a vinyl aromatic compound; a vinyl nitrile compound; a $C_4$-$C_{12}$ diene; a $C_2$-$C_{12}$ homoolefin or halogen substituted homoolefin; a $C_1$-$C_{12}$ dialkyl maleate, fumarate or itaconate; a $C_1$-$C_{10}$ alkyl or a $C_6$-$C_{12}$ aryl maleimide; vinyl acetate; vinyl benzoate; vinyl carbazole; vinyl cyanide; vinyl pyridine; a $C_8$-$C_{16}$ alkyl vinyl ether; allyl acetate; a $C_1$-$C_{12}$ alkyl vinyl ketone or sulfone; and an oxazoline compound; and
  (ii) a fluorinated olefinic polymer or copolymer which is present in a melt strength increasing amount of about 0.001 percent to about 5 percent of said composition by weight;
(b) extrusion melt processing said composition into a hollow preform which weighs more than ten pounds, wherein the melt strength of said hollow preform is increased by the presence of said fluorinated olefinic polymer or copolymer; and
(c) blow molding said automotive component which weighs more than five pounds from said hollow preform.

29. The method of claim 28 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber of a mixture thereof.

30. The method of claim 28 wherein said composition further consists essentially of one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

31. The method of claim 28 wherein said hollow preform exceeds twelve inches in diameter and sixty inches in length.

32. The method of claim 28 wherein said automotive component is an instrument panel.

33. A method of blow molding a contoured automotive part which weighs more than five pounds, comprising (a) providing a composition which consists essentially of a mixture of (i) one or more of the members of the group consisting of polyamide; polyester; poly(methyl methacrylate); polyolefin homopolymer; poly(phenylene ether); polystyrene; polyurethane; acrylonitrile/EPDM/styrene copolymer where EPDM is ethylene/propylene/diene rubber; ethylene/carbon monoxide copolymer; ethylene/carbon monoxide copolymer grafted with one or more vinyl monomers; polyacetal; polyacrylamide; polyacrylate; polyacrylonitrile; polyalkenamer (polyalkenylene); polyaminotriazole; polyacrylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); copolyester/carbonate; ethylene/vinyl acetate copolymer; polycarbonate formed from more than one dihydroxy compound; and polyester formed from more than one diol and/or more than one diacid;

(ii) one or more copolymers prepared from one or more members of the group of monomers consisting of a $C_1$-$C_{12}$ alkyl acrylate or methacrylate; acrylamide or methacrylamide; a vinyl aromatic compound; a vinyl nitride compound; a $C_4$-$C_{12}$ diene; a $C_2$-$C_{12}$ homoolefin or halogen substituted homoolefin; a $C_1$-$C_{12}$ dialkyl maleate, fumarate or itaconate; a $C_1$-$C_{10}$ alkyl or a $C_6$-$C_{12}$ aryl maleimide; vinyl acetate; vinyl benzoate; vinyl carbazole; vinyl cyanide; vinyl pyridine; a $C_8$-$C_{16}$ alkyl vinyl ether; allyl acetate; a $C_1$-$C_{12}$ alkyl vinyl ketone or sulfone; and an oxazoline compound; and (iii) a fluorinated olefinic polymer or copolymer which is present in a melt strength increasing amount of about 0.001 percent to about 5 percent of said composition by weight;

(b) extrusion melt processing said composition into a hollow preform which weighs more than ten pounds, wherein the melt strength of said hollow preform is increased by the presence of said fluorinated olefinic polymer or copolymer; and (c) blow molding said automotive component which weighs more than five pounds from said hollow preform.

34. The method of claim 33 wherein said composition further consists essentially of an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber of a mixture thereof.

35. The method of claim 33 wherein the polyester of component (i) is a polycarbonate, a non-carbonate polyester or a mixture thereof.

36. The method of claim 33 wherein said composition further consists essentially of one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

37. The method of claim 33 wherein said hollow preform exceeds twelve inches in diameter and sixty inches in length.

38. The method of claim 33 wherein said automotive component is an instrument panel.

39. A method of blow molding a contoured automotive part which weighs more than five pounds, comprising (a) providing a composition which comprises a mixture of (i) one or more of the members of the group polymers and copolymers consisting of polyamide; polyester; poly(methyl methacrylate); polyolefin homopolymer; poly(phenylene ether); polystyrene; polyurethane; acrylonitrile/EPDM/styrene copolymer where EPDM is ethylene/propylene/diene rubber; ethylene/carbon monoxide copolymer; ethylene/carbon monoxide copolymer grafted with one or more vinyl monomers; polyacetal; polyacrylamide; polyacrylate; polyacrylonitrile; polyalkenamer (polyalkenylene); polyaminotriazole; polyacrylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); copolyester/carbonate; ethylene/vinyl acetate copolymer; polycarbonate formed from more than one dihydroxy compound; and polyester formed from more than one diol and/or more than one diacid; and (ii) a fluorinated olefinic polymer of copolymer which is present is a melt strength increasing amount of about 0.001 percent to about 5 percent of said composition by weight;

the polymers and copolymers of said composition not including any reactive species which would cause cross-linking or chemical bonding of any of said polymers or copolymers with each other;

(b) extrusion melt processing said composition into a hollow preform which weighs more than ten pounds, wherein the melt strength of said hollow preform is increased by the presence of said fluorinated olefinic polymer or copolymer; and (c) blow molding said automotive component which weighs more than five pounds from said hollow preform.

40. The method of claim 39 wherein said polymers and copolymers further comprise one or more copolymers prepared from one or more members of the group of monomers consisting of a $C_1$-$C_{12}$ alkyl acrylate or methacrylate; acrylamide or methacrylamide; a vinyl aromatic compound; a vinyl nitrile compound; a $C_4$-$C_{12}$ diene; a $C_2$-$C_{12}$ homoolefin or halogen substituted homoolefin; a $C_1$-$C_{12}$ dialkyl maleate; fumarate or itaconate; a $C_1$-$C_{10}$ alkyl or a $C_6$-$C_{12}$ aryl maleimide; vinyl acetate; vinyl benzoate; vinyl carbazole; vinyl cyanide; vinyl pyridine; a $C_8$-$C_{16}$ vinyl ether; allyl acetate; a $C_1$-$C_{12}$ alkyl vinyl ketone or sulfone; and an oxazoline compound.

41. The method of claim 39 wherein said composition further comprises an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

42. The method of claim 39 wherein the polyester of component (i) is a polycarbonate, a non-carbonate polyester of a mixture thereof.

43. The method of claim 39 wherein said composition further comprises one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

44. The method of claim 39 wherein said hollow preform exceeds twelve inches in diameter and sixty inches in length.

45. The method of claim 39 wherein said automotive component is an instrument panel.

46. A method of blow molding a contoured automotive component which weighs more than five pounds, comprising
 (a) providing a composition which comprises
  (i) non-carbonate thermoplastic polymeric material; and
  (ii) a non-fibril forming fluorinated olefinic polymer of copolymer which is present in a melt strength increasing amount of about 0.001 percent to about 5 percent of said composition by weight;
 (b) extrusion melt processing said composition into a hollow preform which weighs more than ten pounds, wherein the melt strength of said hollow preform is increased by the presence of said non-fibril forming fluorinated olefinic polymer or copolymer; and
 (c) blow molding said automotive component which weighs more than five pounds from said hollow preform.

47. The method of claim 46 wherein said non-carbonate thermoplastic polymeric material comprises one or more of the members of the group consisting of polyamide, non-carbonate polyester; poly(methyl methacrylate); polyolefin homopolymer; poly(phenylene ether); polystyrene; polyurethane; acrylonitrile/butadiene/styrene copolymer; acrylonitrile/EPDM/styrene copolymer where EPDM is ethylene/propylene/diene rubber; acrylonitrile/styrene/acrylate copolymer; ethylene/carbon monoxide copolymer; styrene/acrylonitrile copolymer; and a blend of (A) poly(phenylene ether), (B) polystyrene, and (C) a vinyl aromatic/conjugated diene di- or tri-block copolymer.

48. The method of claim 46 wherein said non-carbonate thermoplastic polymeric material comprises one or more of the members of the group consisting of polyacetal; polyacrylamide; polyacrylate; polyacrylonitrile; polyalkenamer (polyalkenylene); polyaminotriazole; non-carbonate polyacrylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); vinyl acetate copolymer; vinyl alcohol copolymer; vinyl amide copolymer; vinyl chloride copolymer; vinyl ether copolymer; ethylene vinyl acetate copolymer; methyl methacrylate/butadiene/styrene/acrylonitrile copolymer; phenyl maleimide/acrylonitrile/butadiene/styrene copolymer; non-carbonate polyester formed from more than one diol and/or more than one diacid; a blend of polyphenylene ether, polyamide and a vinyl aromatic/conjugated di- or tri-block copolymer; and styrene/maleic anhydride copolymer.

49. The method of claim 46 wherein said non-carbonate thermoplastic polymeric material comprises a copolymer prepared from one or more members of the group of monomers consisting of a $C_1-C_{12}$ alkyl acrylate or methacrylate; acrylamide or methacrylamide, a vinyl aromatic compound; a vinyl nitrile compound; a $C_4-C_{12}$ diene; a $C_2-C_{12}$ homoolefin or halogen substituted homoolefin; a $C_1-C_{12}$ dialkyl maleate, fumarate or itaconate; a $C_1-C_{10}$ alkyl or a $C_6-C_{12}$ aryl maleimide; vinyl acetate; vinyl benzoate; vinyl carbazole; vinyl cyanide; vinyl pyridine; a $C_8-C_{16}$ alkyl vinyl ether; allyl acetate; a $C_1-C_{12}$ alkyl vinyl ketone or sulfone; and an oxazoline compound.

50. The method of claim 47 wherein said non-carbonate thermoplastic polymeric material does not include any reactive species which would cause cross-linking or chemical bonding of any of said polymers of copolymers with each other.

51. The method of claim 48 wherein said non-carbonate thermoplastic polymeric material does not include any reactive species which would cause cross-linking or chemical bonding of any of said polymers of copolymers with each other.

52. The method of claim 49 wherein said non-carbonate thermoplastic polymeric material does not include any reactive species which would cause cross-linking or chemical bonding of any of said polymers or copolymers with each other.

53. The method of claim 47 wherein said blend of (a) poly(phenylene ether), (b) polystyrene and (c) a vinyl aromatic/conjugated diene di- or tri-block copolymer is (I) such a blend wherein said vinyl aromatic/conjugated diene di- or tri-block copolymer is grafted to said polystyrene, (II) such a blend wherein said vinyl aromatic/conjugated diene di- or tri-block copolymer is not grafted to said polystyrene, or a mixture of blends (I) to (II).

54. The method of claim 46 wherein said composition further comprises an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

55. The method of claim 46 wherein said composition further comprises one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

56. The method of claim 46 wherein said hollow preform exceeds twelve inches in diameter and sixty inches in length.

57. The method of claim 46 wherein said automotive component is an instrument panel.

58. A method of blow molding a contoured automotive component which weighs more than five pounds, comprising
 (a) providing a composition which comprises
  (i) thermoplastic polymeric material; and
  (ii) one or more fibril forming or non-fibril-forming fluorinated olefinic polymers or copolymer selected from the group consisting of fluorinated ethylene/propylene copolymers, perfluoroalkyoxy fluorocarbons, and ethylene/tetrafluoroethylene copolymers, which is present in a melt strength increasing amount of about 0.001 percent to about 5 percent of said composition by weight;

(b) extrusion melt processing said composition into a hollow preform which weighs more than ten pounds, wherein the melt strength of said hollow preform is increased by the presence of said non-fibril forming fluorinated olefinic polymer or copolymer; and (c) blow molding said automotive component which weighs more than five pounds from said hollow preform.

59. The method of claim 58 wherein said thermoplastic polymeric material comprises one or more of the members of the group consisting of polyamide; polyester; poly(methyl methacrylate); polyolefin homopolymer; poly(phenylene ether); polystyrene; polyurethane; acrylonitrile/butadiene/styrene copolymer; acrylonitrile/EPDM/styrene copolymer where EPDM is ethylene/propylene/diene rubber; acrylonitrile/styrene/alkyl acetate acrylate copolymer; ethylene/carbon monoxide copolymer; styrene/acrylonitrile copolymer; and a blend of (A) poly(phenylene ether), (B) polystyrene, and (C) a vinyl aromatic/conjugated diene di- or tri-block copolymer.

60. The method of claim 58 wherein said thermoplastic polymeric material comprises one or more of the members of the group consisting of polyacetal; polyacrylamide; polyacrylate; polyacrylonitrile; polyalkenamer (polyalkenylene); polyaminotriazole; polyacrylate; poly(arylene sulfide); azo polymers; polybenzimidazole; polyetheretherketone; poly(ethylene oxide); polyhydrazide; polyimidazole; polyimide; polyisocyanide; polyketone; polyphosphazine; poly(propylene oxide); polyquinoxaline; polysilane; polysiloxane; polysulfone; polyurea; poly(vinyl acetate); poly(vinyl alcohol); poly(vinyl amide); poly(vinyl chloride); poly(vinyl ether); vinyl acetate copolymer; vinyl alcohol copolymer; vinyl amide copolymer; vinyl chloride copolymer; vinyl ether copolymer, co-polyester/carbonate; ethylene/vinyl acetate copolymer; methyl methacrylate/butadiene/styrene/acrylonitrile copolymer; phenyl maleimide/acrylonitrile/butadiene/styrene copolymer; polycarbonate formed from more than one dihydroxy compound; polyester formed from more than one diol and/or more than one diacid; a blend of polyphenylene ether, polyamide and a vinyl aromatic/conjugated di- or tri-block copolymer; and styrene/maleic anhydride copolymer.

61. The method of claim 58 wherein said thermoplastic polymeric material comprises a copolymer prepared from one or more members of the group of monomers consisting of a $C_1$-$C_{12}$ alkyl acrylate or methacrylate; acrylamide or methacrylamide; a vinyl aromatic compound, a vinyl nitrile compound; a $C_4$-$C_{12}$ diene; a $C_2$-$C_{12}$ homoolefin or halogen substituted homoolefin; a $C_1$-$C_{12}$ dialkyl maleate, fumarate or itaconate; a $C_1$-$C_{10}$ alkyl or a $C_6$-$C_{12}$ aryl maleimide; vinyl acetate; vinyl benzoate; vinyl carbazole; vinyl cyanide; vinyl pyridine; a $C_8$-$C_{16}$ alkyl vinyl ether; allyl acetate; a $C_1$-$C_{12}$ alkyl vinyl ketone or sulfone; and an oxazoline compound.

62. The method of claim 59 wherein said thermoplastic polymeric material does not include any reactive species which would cause cross-linking or chemical bonding of any of said polymers or copolymers with each other.

63. The method of claim 60 wherein said thermoplastic polymeric material does not include any reactive species which would cause cross-linking or chemical bonding of nay of said polymers or copolymers with each other.

64. The method of claim 61 wherein said thermoplastic polymeric material does not include any reactive species which would cause cross-linking or chemical bonding of nay of said polymers or copolymers with each other.

65. The method of claim 59 wherein said polyester is a polycarbonate, a non-carbonate polyester or a mixture thereof.

66. The method of claim 59 wherein said blend of (a) poly(phenylene ether), (b) polystyrene and (c) a vinyl aromatic/conjugated diene di- or tri-block copolymer is (I) such a blend wherein said vinyl aromatic/conjugated diene di- or tri-block copolymer is grafted to said polystyrene, (II) such a blend wherein said vinyl aromatic/conjugated diene di- or tri-block copolymer is not grated to said polystyrene, or a mixture of blends (I) and (II).

67. The method of claim 58 wherein said fluorinated olefinic polymer or copolymer is an ethylene/tetrafluoroethylene copolymer.

68. The method of claim 58 wherein said composition further comprises an impact modifying amount of a core-shell elastomeric impact modifier, a selectively hydrogenated vinyl aromatic/conjugated diene di- or tri-block copolymer, neoprene, nitrile rubber, polyether rubber, polyisoprene, silicone rubber or a mixture thereof.

69. The method of claim 58 wherein said composition further comprises one or more additives selected from the group consisting of fillers, thermal stabilizers, dyes, flame retarding agents, reinforcing agents, softeners, mold-release agents, seed-forming agents, pigments, plasticizers, antistatic agents, ultra violet light absorbers, lubricants and compatibilizers.

70. The method of claim 58 wherein said hollow preform exceeds twelve inches in diameter and sixty inches in length.

71. The method of claim 58 wherein said automotive component is an instrument panel.

* * * * *